DEVICE FOR CHARACTER RECOGNITION

Filed Jan. 11, 1965

INVENTORS:

THEODORUS REUMERMAN
WILLEM H.T. HELMIG
by: Stephen [signature], Atty.

INVENTORS:
THEODORUS REUMERMAN
WILLEM H.T. HELMIG
by: Stephen A. Frishauf, Atty.

United States Patent Office 3,432,809
Patented Mar. 11, 1969

3,432,809

DEVICE FOR CHARACTER RECOGNITION

Theodorus Reumerman, Zandvoortselaan 12, Zandvoort, Netherlands, and Willem Hendrik Theodoor Helmig, Clovistraat 57, Haarlem, Netherlands Filed Jan. 11, 1965, Ser. No. 424,717
Claims priority, application Germany, Jan. 10, 1964, R 36,948
U.S. Cl. 340—146.3 13 Claims
Int. Cl. G06k 9/18

ABSTRACT OF THE DISCLOSURE

To recognize symbols having black content printed in predetermined zones, in spite of misalignment of characters and sensing heads, separate signals corresponding to the printed zones are read into predetermined storage positions of a store, a sensing circuit senses the outermost occupied storage position therein and, as a result of said sensing, transfers the information into an auxiliary storage having a number of storage places equal to the number of zones.

Figure 1:
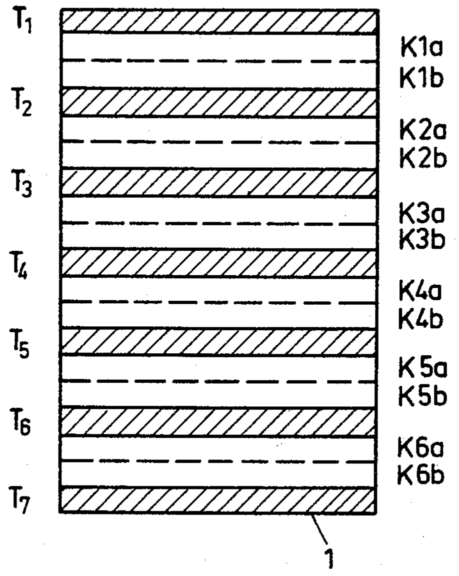

The present invention relates to a device for reading out or recognizing characters, symbols or data which are printed on a carrier such as a document, a check or insurance policy. The invention relates particularly to a reading device for such characters which are printed with a magnetizable ink, have the form of usual numbers, letters or other symbols and are provided with interruptions or gashes according to a predetermined scheme in longitudinal or diagonal direction which represent a recognition code.

The characters to be recognized are adapted to be arranged in a rectangular raster which is subdivided in zones. A part of these zones serves as coding zones. Separating or interspace zones are provided between said coding zones. Interruptions are never provided in these separating zones, i.e., said zones are always filled with magnetizable ink. The symbols coded in such a manner are passed behind a scanning head comprising a plurality of scanning elements, the length and minimum number of which can be determined from the code selected. Said scanning elements are responsive to the magnetizable ink by which the symbols are printed. If one of the scanning elements scans an interruption in the coding zone, said element does not deliver a signal, since there is no magnetizable ink in the interruption in the coding zone. By the missing signals at predetermined scanning elements the symbols may be recognized.

It is necessary for this reading method that the symbols pass the scanning elements in a predetermined position. When the symbols are arranged somewhat too high or too low because for instance the symbols have not been printed in the correct line height or because the document has not been guided correctly in the reading device, errors may arise when identifying the symbols. Additionally, not only the position of the symbol may vary, but differences in the printed results may arise in the printed symbol itself. This is for instance possible when the ink runs out, when the paper absorbs the ink or when the contours of the print are not sharp. Further differences in the print occur when the print is effected by different pressure, when the print is for instance effected on a typewriter with strokes of different pressure. It is then possible that the "black" zones increase at the expense of the "white" zones. Further difficulties arise from the irregular distribution of the magnetic metal oxide particles in the magnetic ink, by the shrinking or extension of the symbol carriers and for other reasons.

In known devices for reading symbols serially very high requirements had to be fulfilled with regard to the quality of the symbol carrier as for instance the paper as well as with regard to the quality of the magnetic ink. It was also necessary that the printing mechanism worked precisely and that the timing device for controlling the complete reading device must be very accurate. This is the reason why the possibilities of application of these hitherto known reading devices and thus the automatic recognition of symbols in data processing machines were restricted so far.

In order to be able to read such symbols which pass the scanning elements somewhat too high or too low German published application 1,155,276 discloses a device, which is characterized in that a series of scanning elements is provided projecting in known manner beyond the height of the symbols and coacting in a manner known per se each with a register element and belonging alternatively to at least two groups of register elements, the distance between two adjacent scanning elements of the same group corresponding with the distance between the central lines of adjacent interruptions zones and which form a separate signal register with one group of coordinated register elements. It is also possible with this device to allow relatively large tolerances for printing the symbols. It is not described in said German published application how the scanned symbols shall further be processed.

The present invention relates also to a device for reading symbols which allows a correct recognition of symbols also when the symbols are shifted upwardly or downwardly relative to their correct position in view of the scanning head and wherein no timing frequencies are required for reading the symbols. The reading device is provided with two series of scanning elements, the distance of which corresponds with the largest width which could appear in one of the symbols to be read.

A reversible counter is provided which operates when the first storage element is set in that storage in which the information is stored which is scanned by the first line of the scanning elements, and which counter is reversed when the first storage element of a second storage is reset in which the information is stored which is scanned by the second series of scanning elements. The complete device is arranged in such a manner that the first storage is read when the first storage element in the second storage is set, and the second storage is read when the reversible counted is returned into the zero position. These two storages of this device are read into a plurality of staggered auxiliary storages. Said auxiliary storages are provided with storage places for each coding zone and with an additional storage place wherein to store the information for the uppermost separating zone. The selection of the storages has to be effected in accordance with the position of the uppermost separating zone, since thereby the correct position of the symbols relative to the scanning head is determined. Then the selected auxiliary storage has to be read out in series.

This system has, however, certain difficulties: When the symbols are coded in accordance with an "$x$ of $n$" code, these storages contain "$n$" storage places for the coding zones as well as a further storage place for the uppermost separating zone, i.e., $n+1$ storage places. In order to recognize an "$x$ of $n$" code it is necessary to know the contents of $n$ storage places; when reading the storage in series always $n+1$ informations are received according to this suggestion, since it can never be avoided that the informations on the uppermost separating zone are supplied additionally to the informations on the "$n$" coding zones. It is, however, impossible to coordinate clearly an "$x$ of $n$" code with $n+1$ informations.

It is therefore an object of the present invention to provide a read out device for symbols allowing a precise recognition of symbols also when the symbols are shifted downwardly or upwardly in relation to the scanning head, wherein furthermore the reading process is effected in parallel and which does not require timing pulses of a predetermined frequency for the read out. The reading device shall also operate satisfactorily and produce correct results when the above described differences occur.

In carrying out the present invention one embodiment of the device comprises two series of staggered scanning elements arranged one behind the other and spaced apart in the scanning direction for a distance of the maximum character width, a first and a second register coordinated to the two series of scanning elements, means controlling the selection of the two registers, at least one reversible counter an intermediate storage into which the informations from the first register are read in when the reversible counter is reversed, and into which the informations from the second register are read in when the reversible counter has counted back to zero, an interrogating device checking the intermediate storage for the outermost storage place into which a scanned character part is stored, and allowing as a result of this check the transmission of the information from the intermediate storage into one of a plurality of auxiliary or buffer storages, having a number of digits which corresponds with the number of the assumed zones, and which are staggered in such a manner that they are coordinated with well defined overlapping sections of the series of scanning elements.

When the informations which have scanned the scanning elements of the scanning head, have been read into the intermediate storage, the first storage places of the intermediate storage are sensed in order to determine which is the first storage place into which an information was read in. A determination is also effected at the same time in which height the symbol has passed the scanning head. On account of this determination all the auxiliary storages are blocked except that auxiliary storage having a first storage place which is coordinated to the uppermost scanning element which has scanned an information. All the storage places of said auxiliary storage which have stored informations from the scanning elements of the coding zones of the symbol raster, are read out in parallel and their contents is supplied to a symbol decoder. The auxiliary storages are adapted to switch or be switched in a cyclic sequence in order to test in which storage place the first information was read in.

A further embodiment of the present invention comprises an arrangement of auxiliary storages to effect a simple check whether the scanning head has read the symbol in the correct manner. It is necessary to check whether the scanning elements which scan the separating zones of the imaginary symbol field, supply all the signal "black." If desired the scanning elements of the scanning head can be tested also whether in the coding zones white signals are present twice and/or 2 $(n-x)$ black signals are present, provided the symbol is coded in accordance with the "$x$ of $n$" code. Recognition errors are avoided thereby which may be caused by misprinted data.

It is possible with such a device to avoid the use of special signals which indicate the beginning or the end of a reading process. When two reversible counters are used, a signal can be derived from the response of one of the two counters following the response of the other of the two counters, which signal means the beginning of a reading process and a signal can be derived from the return of one of the two reversible counters to zero at a time when the other of the two counters does not count, which signal indicates the end of a reading process.

Figure 2:
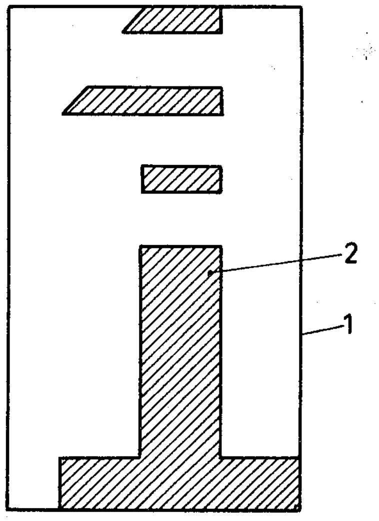
Figure 3:
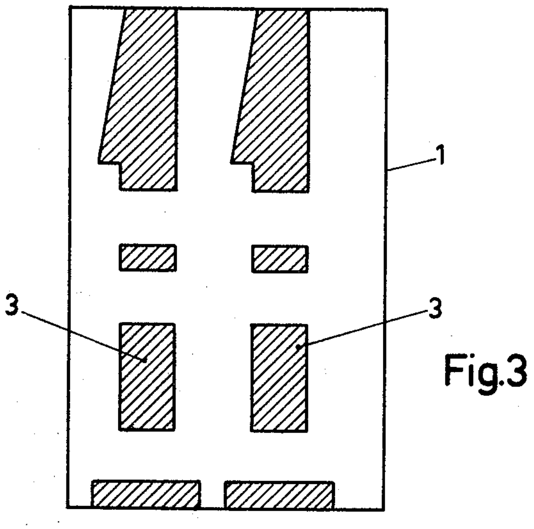

The novel features believed characteristic of the invention are set forth in the appended claims. The invention itself, together with further objects and advantages thereof, may best be understood by the following description taken in connection with the accompanying drawings in which:

FIG. 1 shows a schematic diagram of an imaginary symbol field,

FIGS. 2 and 3 representations of a coded "1" and "11," respectively, and

Figure 4:
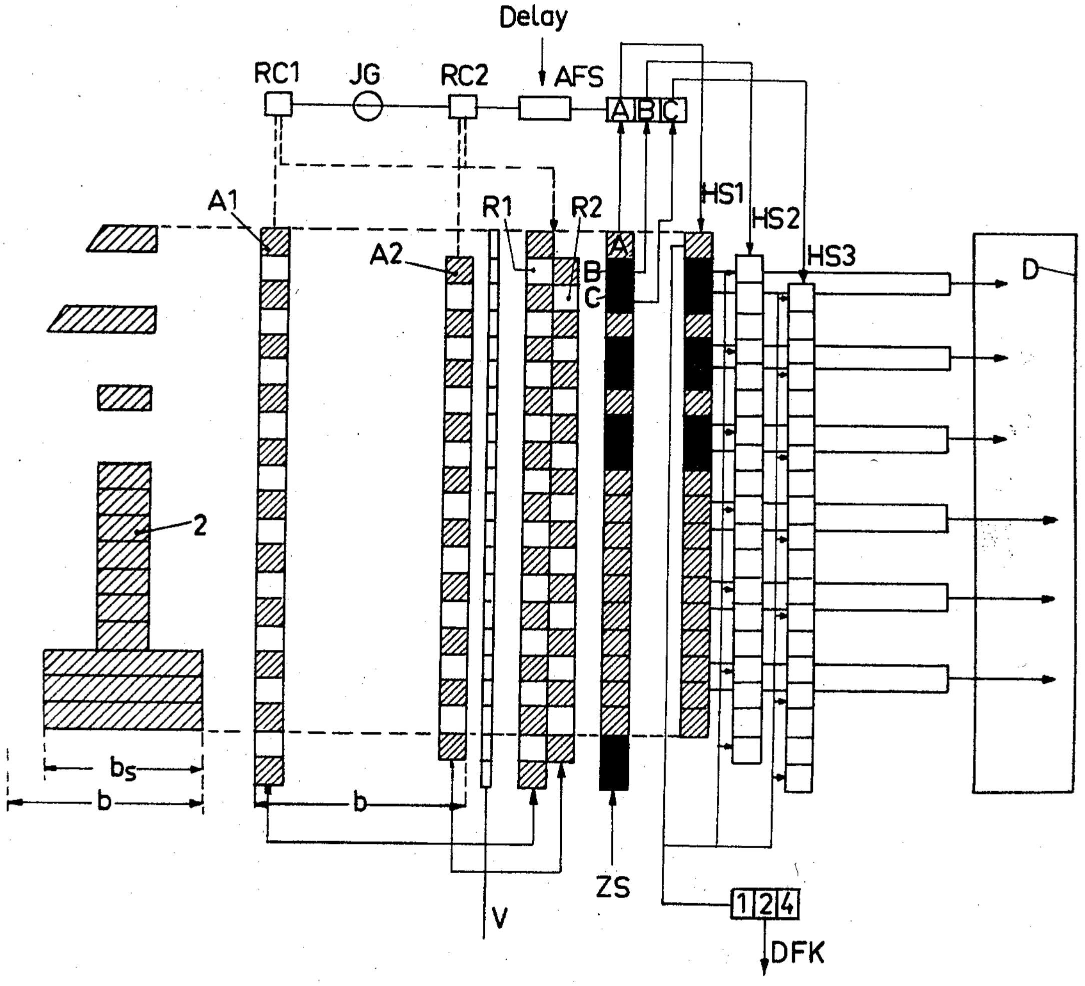

FIG. 4 is a block diagram of a reading device according to the invention.

It is assumed in the following description of an embodiment of the present invention that the symbols are provided with interruptions in such a manner that the interruptions form a "3 of 6" code. Of course, every other code can also be used, such as a "$p$ of $n$" code or binary code.

FIG. 1 shows a symbol field 1 as it is used in case of symbols with an "$n$ of 6" code. The height of this field corresponds precisely with the height of the symbols. The symbols themselves are not allowed to be broader than the symbol raster. It is, however, not required that they fill the width of the symbol raster. It is not required either that the symbol consists of one single mark only. Two or more data can be composed to form one symbol. FIGS. 2 and 3 show a coded "1" as an example and a coded "11," respectively. The combination of two-figure numbers to form a symbol, for instance the representation of a "10" or a "11" by a symbol is of special meaning for English business machines since in these systems the money values for 10 and 11 Pence are mostly processed as a symbol.

The symbol raster 1 of FIG. 1 is divided in horizontal zones. The zones T1–T7 are separating or interspace zones. The zones K1$a$–K6$b$ are used for coding. The zones K1$a$, K1$b$ and T1 have the same height so that a coding zone has the double height as a separating zone. The interruptions are provided in the coding zones, i.e., in case of a printed symbol the magnetizable ink is left out over the complete coding zone.

As can be taken from FIGS. 2 and 3, the symbols 2 and 3 fit in their height theoretically exactly into the symbol raster. It should, however, be considered that differences will always occur due to the printing process. Contrary to the known reading systems which are necessarily bound to a timing frequency, it is not difficult in case of the present reading device for parallel read out to recognize the marks or symbols correctly when differences in the magnitude of the symbols and in the height of the coding zone occurs in the printing process. It can be seen that the imaginary symbol field 19 is provided with zones, namely 7 separating zones and 12 semizones, which serve the coding in pairs. In a typewriter embodiment for placard writing the height of the symbol field is about 4.5 mm. and its width 2 mm. The dimensions of the symbol raster may also be smaller or larger since all the usual printing types can be used. The symbols pass a scanning head which is provided with a plurality in the present case 21 scanning elements. The scanning elements are arranged in two lines A1 and A2 one behind the other and have a gap length which corresponds with the height of a separating zone or the height of a coding semizone. The scanning elements in the two lines A1 and A2 are staggered, i.e., the scanning elements of the first line A1 scan the odd zones of the symbol field when the separating zones and the coding zones are numbered with consecutive numbers of 1 through 19. The scanning element in the second line A2 are provided for the even zones of the symbol raster. It can be understood now why the coding zones are twice as high as the separating zone and are scanned by two scanning elements. Supposing the coding zones have the same height as the separating zones and that one single scanning element is provided for each of the zones, the case often arises that a scanning element scans the separating line between a coding zone and a separating zone. No clear read out is possible then whether an interruption is present at this place or not. When however, the coding zone is twice as high as the separating zone and is scanned by two scanning elements, a part of a coding zone passes at least one of these scanning elements wherein exclusively an interruption is provided. A clear answer can then be obtained about the coding.

FIG. 4 shows a complete circuit arrangement of a reading device according to the invention. It shows in the left hand side the symbol 2, namely a coded "1," which is divided in 19 zones. The distance "*b*" which is drawn below the coded "1" and also below the scanning lines A1 and A2, represents the maximum width of the symbol field. The interruptions which represent the machine coding are arranged in the first three coding zones K1*a*, *b*; K2*a*, *b* and K3*a*, *b*. This "1" symbol passes the two lines of scanning elements A1 and A2 from the right to the left side. The distance between the front edge of the line A1 and the rear edge of the line A2 corresponds with the maximum width *b* of the symbol field. Said scanning elements belong to a scanning head. The width of the individual scanning elements, corresponds with the height of a separating zone T1–T7 or of the height of a coding semizone. Even if only 19 scanning elements are required for scanning the complete symbol field, additional scanning elements are provided according to the invention. The front line A1 of the scanning element 11 and the rear line A2 shows 10 elements so that in total 21 scanning elements are provided.

Two registers R1 and R2 are coordinated to the two lines of scanning elements, repsectively. A register place is provided for each scanning element. The informations received by the scanning elements are transferred into the registers after being amplified in the amplifiers V. The contents of the two registers is transferred into an intermediate storage ZS under the control of one or a plurality of reversible counters RC1 and RC2 which receive their counting pulses from a pulse generator JG. The number of storage places in the intermediate storage ZS corresponds with the number of the scanning elements.

After a symbol has passed the scanning head and after the informations scanned are transmitted into the intermediate storage, the informations "white" represented as black in the drawing are present in 8 storage places and the informations "black" represented as hatched in the drawing present in 13 storage places. The information "white" is therefore present in three pairs of storage places, because the coding interruptions are arranged in the three coding zones K1*a*; *b*; K2*a*, *b* and K3*a*, *b* or in six coding semizones. The remaining two "white" storage places are caused by the fact that the symbol field is provided with only 19 zones, that the scanning head is, however, provided with additional scanning elements, in the present embodiment with two additional scanning elements. Said two additional scanning elements pass the imaginary symbol field 1 so that they may not contact the magnetizable ink and do not scan an information.

In the code used herein the uppermost zone T1 is always a separating zone, i.e., magnetizable ink is always present in the uppermost zone of each symbol field. The uppermost scanning element in the zone of the imaginary symbol field must therefore always deliver the information "black." When a symbol has passed the scanning head and the information scanned has been transferred into the intermediate storage, it is enough to find out which storage place A, B or C counted from the top is the first storage place into which the information "black" has been read in, in order to determine the correct position of the symbol passing the scanning head.

It is certain then that the informations of the scanning head can be found in this and the following 18 storage places. If for instance the symbol passes the scanning head in its "desired" or "normal position" the scanning elements 2 through 20 are adapted to scan its symbol raster. The first storage place in which the information "black" is recorded, is the second storage place B from the top. The first and the last scanning element do not supply in this case any information or the information "white," respectively. When the symbol is displaced upwardly when passing the scanning head, the information "black" is recorded in the first storage place A of the intermediate storage, and the storage places 20 and 21 remain empty. When the symbol is displaced downwardly, the informations which give particulars of the infomations in the individual zones of the symbol raster, are found in the storage places 3 through 21.

The two additional scanning elements are sufficient to allow a displacement of the symbol upwardly or downwardly for ±8 mil. It is also possible to increase the tolerable displacement by providing additional scanning elements and by providing the intermediate storage and the registers with additional storage places.

In order to identify an "*n* of 6" code it is necessary to scan six storage places. As the intermediate storage contains 21 storage places, a direct identification from the intermediate storage is impossible. This is why the additional auxiliary storages are provided in accordance with the present invention. The embodiment shown in FIG. 4 utilizes three additional auxiliary storages HS1, HS2 and HS3. It can be seen that the auxiliary storages are staggered and are provided with a number of storage places identical with the number of zones of the symbol field. Furthermore a sensing or checking circuit AFS is provided, having its inputs connected with the three uppermost storage elements ABC of the intermediate storage and the three outputs connected to the three auxiliary storages HS1, HS2 and HS2. When a symbol has passed the scanning head and the informations are transferred into the intermediate storage ZS, the sensing or checking circuit AFS determines the uppermost storage place carrying the information "black." Depending on the result of this determination, the sensing or checking circuit effects the transfer of the contents of the intermediate storage into one of the three auxiliary storages. When the sensing or checking circuit determines that the information "black" is stored in the uppermost storage place A of the intermediate storage, it effects the transfer of the informations from the intermediate storage into the first auxiliary storage HS1. When the second storage place B of the intermediate storage is occupied, the informations are transferred into the second auxiliary storage HS2. When a "black" information is stored only in the third storage place C of the intermediate storage, the informations are transferred into the third auxiliary storage HS3.

It is made sure in this way that the informations which are recorded in the auxiliary storages are exclusively such informations obtained by scanning the symbol raster by the scanning head. That means, that any "white" informations are avoided originating from scaning elements lying above or below the passing symbol.

The sensing or checking circuit receives its control pulse from the second reversible counter RC2.

When the symbols are read out as described above the sensing or checking circuit AFS may receive its control pulse causing the sensing or checking of the intermediate storage, from the second reversible counter RC2. As the function of said counter is controlled by the symbol when reading out said symbol, the function of the sensing or checking circuit is also controlled by the symbol. As the reading out of the symbol is independent of the width of the symbols, i.e., symbols of different width can be read out with the same certainty and as it is unimportant for the read out with which speed the symbols pass the scanning head, since a timing frequency is not required for the reading, a timing frequency is not required either for transferring the symbol information stored in the intermediate storage into the corresponding auxiliary storage.

Since the state of the separating zones as well as the state of the coding semizones is recorded in one of the three auxiliary storages, an identification of the symbol is possible. Regarding again the symbol field 1, it can be seen that every third storage place must carry the information "black," since every third zone is a separating zone T where no interruptions occur. Consequently, the first, the fourth, the seventh . . . the nineteenth storage place carries the information "black."

Two coding semizones are arranged between each of the separating zones. The corresponding storage places of the auxiliary storage can be combined in pair. Six pairs of storage places are therefore obtained, so that a satisfactory identification of the used "3 of 6" code is possible.

The auxiliary storges HS1, HS2 and HS3 are composed of individual bistable elements such as flip flops or ferrite cores, well known in the art. When a storage place carries the information "black" it is in its "1" state. When a storage place carries the information "white" it is in its "0" state. The reading out and the identification of the symbol can be effected in such a manner that after termination of the information transfer into the auxiliary storage all the storage places are brought into the "1" state. Only those storage places of the auxiliary storage are set in the "1" state into which the information "white" was transferred. The pulses occurring thereby are derived in parallel and supplied to a decoder D. Said decoder may be in this case a simple "and" circuit.

There exists another possibility to check the state of all the pairs of storage places which correspond with the coding zones. Three "white" information signals and three "black" in formation signals are produced thereby; these six information signals are taken out in parallel and supplied to a decoder.

Since, as explained above, it may often happen that the two scanning elements for one coding zone do not both scan the information "white," since one of the two scanning elements on the intermediate field scans along between a coding zone provided with an interruption and a separating zone, it may be favourable to combine the outputs of a pair of storage places carrying the information "white" for a predetermined symbol, by an OR circuit before entering the symbol decoder. This makes it possible to obtain a correctly decodable output signal also when only one of the two storage places belonging to one decoding zone carries the information "white." The device operates independent of the fact whether only one of the two coding zones causes the circuit to respond or set, or both of them. The device becomes thereby completely independent of position displacements. As mentioned above, those storage places which are associated with the separating zones, must always carry the information "black." In the intermediate storage the coordination of the individual storage places to the individual zones or semizones, respectively, of the imaginary symbol field is ambigous. When this ambignity is avoided by providing the auxiliary storage and the sensing or checking circuit AFS of the present invention, a very simple check is made possible whether the scanned character may at all be utilized. When the characters are printed very poor and consequently wrong, a recognition of the character is impossible and a rejection signal is affected. In very unfavourable cases it is even possible that the symbol is identified incorrectly. It is therefore necessary to check the seven storage places of one of the auxiliary storages which is clearly associated with the separating zones for their contents. This effected in the block diagram of FIG. 4 with the printing error control DFK.

The printing error control DFK may be a simple logical circuit which receives signals about the contents of said storage places in parallel and which delivers a signal when not all of the signals are equal. This signal may then be used as warning signal.

The printed error control may also be a usual counter fed with the contents of the seven storage places. This counter delivers a warning signal when it is not advanced for seven steps during the checking operation.

A control of the printed result can also be effected by means of the intermediate storage ZS. When the first storage place of the intermediate storage is in the "black" state after reading a ssymbol, this indicates that it must be a separating zone. Subsequently, six storage places, counting each the third one of all storage places, must be black. Since, with recognition of the separating zones the location of the contents of the coding zones in the intermediate storage become known, it can be determined if required, whether 2 x 3 black fields and 2 x 3 white fields are present in the coding zones. These determinations or examinations can for instance be effected with simple counters which must again be returned to "zero" when the examination is terminated. Such circuits are known per se so that it is not necessary to explain them herein detail.

It must be remarked that the checking in the intermediate storage are pure counting operations, i.e., no decoding operations. A decoding from the intermediate storage without using the above-described auxiliary storages would meet high difficulties.

This control of the printed result from the intermediate storage is favourable always when a character shall be check whether it can be accepted by the data processing system or not. There is for instance the possibility to insert a document in a checking device after being written by a business machine, which checking device comprises only the scanning heads, the two registers and the intermediate storage together with the corresponding circuitry. A complete reading device with additional auxiliary storages and decoder is then not required anymore. When the document is rejected by the cheking device on account of an unsatisfactory print, this document can again be written with the machine. When the document is accepted by the checking device, it may be put aside or filed until a further operation. Errors in the printed result can be determined very easily immediately after the printing at the same place and not while processing which is effected often a long time after the printing of the documents and at a different place.

It is also possible to increase the range of the admissible displacements when guiding a coded character along the scanning head. It is necessary to increase the number of the scanning elements in the scanning head. Then the number of positions in the intermediate storage as well as the number of the auxiliary storages may be increased.

Instead of increasing the number of the auxiliary storages beyond three, it is also possible to design the sensing or checking circuit in such a manner that it prepares the auxiliary storages in cyclical sequence when searching for the first "black" storage element of the intermediate storage. Thus, the number of the auxiliary storages is kept small, the wiring leading to the auxiliary storages is, however, complicated. Which of the two ways will be preferred depends on the existing circumstances. The present invention is not limited to the described "3 of 6" code or to such coded character with an imaginary character field requiring 19 scanning elements. It is, however, important that the number of the scanning elements must be greater than the number of the zones or semizones, respectively, of an imaginary character field for alowing a displacement when passing a character along the scanning head, and that the number of the storage places in the intermediate storage corresponds with the number of the scanning elements. The number of positions of the auxiliary storage should correspond with the number of the zone or semizone respectively of the character field. The number of the auxiliary storages itself may be identical with the number of the scanning elements of the scanning head minus the number of the zone or semizones, respectively, of the imaginary character field plus one. When the uppermost storage place in the intermediate storage is determined which carries the information "black," a predetermined one of said auxiliary storages can be selected as a result of this examination so that the states of the storage places of said auxiliary storage correspond exactly with the states of the zones or semizones, respectively, of the imaginary character field namely "black" or "white." This is a simple possibility to identify the symbols which can very well be effected by a parallel reading out of the corresponding auxiliary storage.

The following will be noted particularly. No special or additional timing frequency is required for the operation of the intermediate storages and auxiliary storages, i.e., for reading in and out, for transferring information or for determining the time when a special operation is released in the storages. It is possible to derive the pulses required therefore from these pulses which are generated or released when reading the symbols.

Due to the fact that according to the invention the states of the zones or semizones, respectively, of the imaginary character field can be cordinated in well defined manner to the storage places of an auxiliary storage even if additional scanning elements are provided, a simple and reliable examination is possible whether the characters are printed correctly. This is of advantage because the checking is effected automatically when reading into the machine. It is therefore not necessary to wait for such error signals or even derive them from a later or succeeding function unit of the machine.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A device for character recognition comprising a series of scanning elements extending beyond the height of the characters, said characters being provided with interruptions extending parallel to the direction of scanning and forming digital markings corresponding to the meaning of the character, said interruptions being arranged in given zones, said scanning elements of said series being arranged in a staggered manner in at least two rows, one row behind the other and spaced apart in the scanning direction for a distance of the maximum character width, a first and a second register associated with said first and said second row of elements, means controlling the selection of said first and said second register, at least one reversible counter, an intermediate storage means into which the informations from said first register are read in when the reversible counter is reversed and into which the informations from said second register are read in when said reversible counter has been counted down to zero, signal generator means recurrently producing pulses for controlling said reversible counter, a plurality of auxiliary storage means; a sensing device sensing said intermediate storage means for the outermost storage place into which a scanned character part is stored and permitting as a result of said sensing the transfer of the information stored in said intermediate storage means into one of the plurality of auxiliary storage means, each having a number of storage places equal to the number of said given zones, said zones being staggered in such a manner, that they are associated with well defined overlapping sections of said rows of scanning elements.

2. A device according to claim 1 in which said sensing of said intermediate storage by said sensing device is caused by a pulse produced by said reversible counter.

3. A device according to claim 1, in which the number of the auxiliary storage places is equal to the number of the scanning elements in the series minus the number of the assumed character zones plus one.

4. A device according to claim 1 in which the contents of the auxiliary places can be read out in parallel.

5. A device according to claim 1 in which the informations are transferred in parallel from the intermediate storage means into the auxiliary storage means.

6. A device for character recognition comprising a series of scanning elements extending beyond the height of the characters, said characters being provided with or gashes extending parallel to the direction of scanning and forming digital markings corresponding to the meaning of the character, said gashes being arranged in given zones, interspace zones between the gashes, said interspace zones having a width corresponding to half the width of the gashes, said scanning elements of said series being arranged in a staggered manner in at least two rows, one row behind the other and spaced apart in the scanning direction for a distance of the maximum character width, a first and a second register associated with said first and said second row of elements, means controlling the selection of said first and said second register, at least one reversible counter, an intermediate storage means having a plurality of storage positions into which the informations from said first register are read in when the reversible counter is reversed and into which the informations from said second register are read in when said reversible counter has been counted down to zero an auxiliary storage means having a plurality of storage places; signal generator means recurrently producing pulses for controlling said reversible counter, a sensing or device sensing the condition of the outermost storage position of said intermediate storage means into which a scanned character part is stored and allowing as result of said sensing the transfer of the information stored in said intermediate storage means into said auxiliary storage means, the number of storage places of said auxiliary storage means being equal to the number of said given zones, said zones being staggered in such a manner that they are associated with well-defined overlapping sections of said rows of scanning elements.

7. A device according to claim 6 including means for a parallel read-out of the auxiliary storages from those places only corresponding to the assumed character zones, so that the contents of the storage places corresponding to the interspace zones are not read-out.

8. A device according to claim 6, including check means for checking the storage places of the auxiliary storage corresponding to said interspace zones and producing a signal in case these storage places are not in the same state.

9. A device according to claim 6 including means for checking the quality of the printing, said means being connected solely with the intermediate storage means and causing read-out of the first storage position of the intermediate storage containing a signal derived from the scanning of a part of the character and then each succeeding third storage position and producing a signal in case the states of these places of the storage are not equal.

10. A device according to claim 1 for reading characters having markings in accordance with a "*p* of *n*" code in which the auxiliary storage means are connected with counting means counting the number of the elements in the one state as well as the number of the elements in the zero state and producing a signal when these two numbers do not correspond with the number to be expected from the "*p* of *n*" code and the number of elements surpassing the height of the character.

11. A device according to claim 6 including three intermediate storage means adapted to be cyclically enabled by the sensing circuit.

12. A device according to claim 1 having a first and a second reversible counter said first and second reversible counters being controlled by said signal generator means said first reversible counter producing a signal after said second reversible counter has counted to zero, said signal indicating the beginning of the scanning so that a special signal indicating the beginning of the scanning is not required.

13. A device according to claim 12, in which a signal is produced indicating the end of the scanning at the return of the second reversible counter to zero when no counting occurs in the first counter whereby no special signal for indicating the end of the scanning is required.

References Cited

UNITED STATES PATENTS

| | | | |
|---|---|---|---|
| 3,173,126 | 3/1965 | Rabinow et al. ---- | 340—146.3 |
| 3,264,608 | 8/1966 | Gattner et al. ------ | 340—146.3 |

MAYNARD R. WILBUR, *Primary Examiner.*

J. SHERIDAN, *Assistant Examiner.*